UNITED STATES PATENT OFFICE.

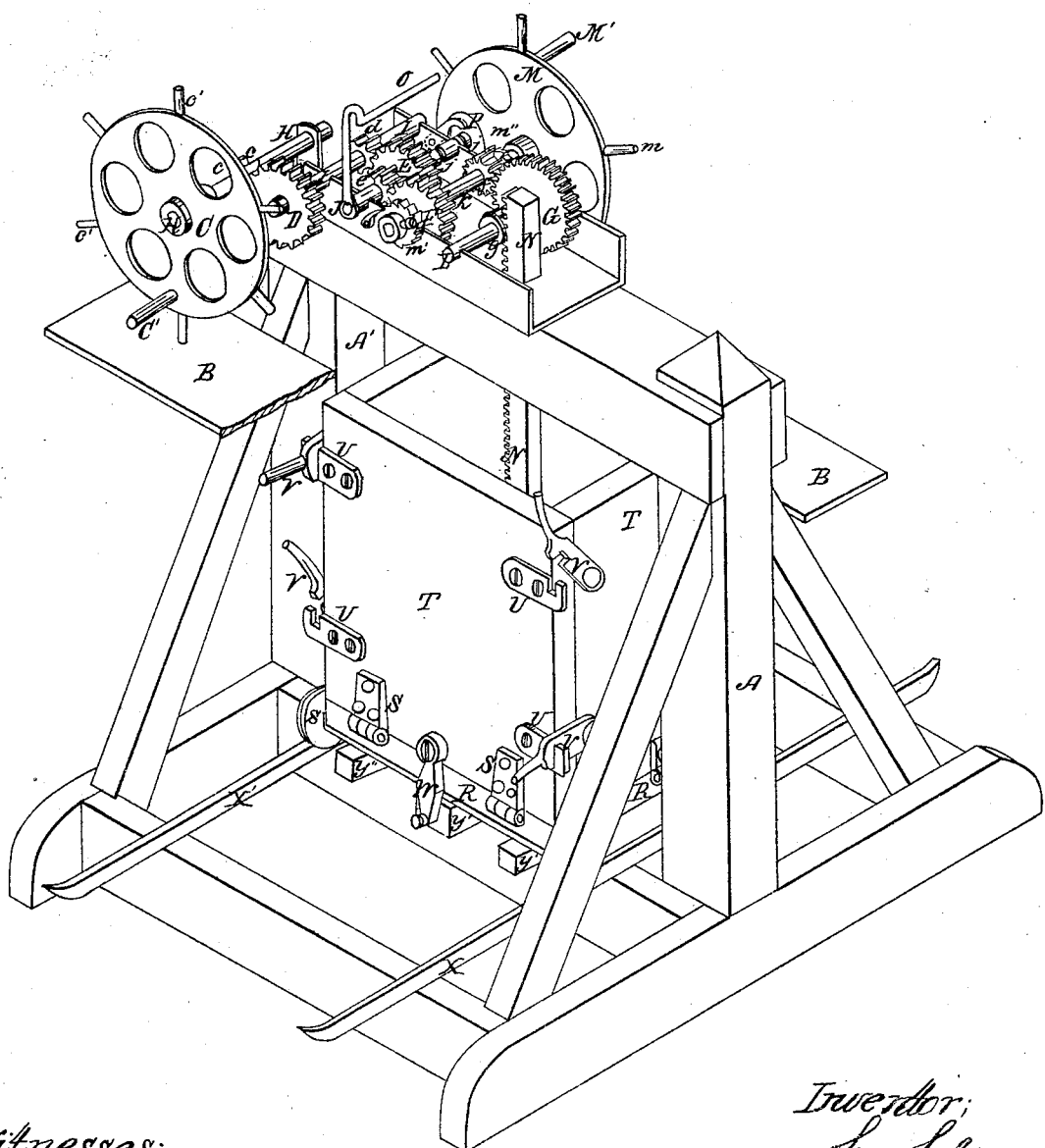

LEOPOLD SEEBERGER AND N. LEVY, OF CINCINNATI, OHIO.

IMPROVEMENT IN BALING-PRESSES.

Specification forming part of Letters Patent No. 56,456, dated July 17, 1866.

*To all whom it may concern:*

Be it known that we, LEOPOLD SEEBERGER and NATHAN LEVY, both of Cincinnati, Hamilton county, and State of Ohio, have invented certain new and useful Improvements in Baling-Presses; and we do hereby declare the following to be a full, clear, and exact description thereof, reference being had to the accompanying drawing, making part of this specification.

Our improvements relate to a press for baling hay, cotton, &c., so constructed as to exert an immense pressure when operated by hand; and the first part of our invention consists in such an arrangement of mechanical devices as to enable the follower to descend rapidly at the commencement of the pressing operation, when the least power is required, and, after the follower has reached a point where more pressure is needed, to enable it to descend with a greatly diminished speed and a corresponding increase of power, and the bale having been sufficiently pressed and bound, the follower is speedily elevated, so as to permit the removal of the baling-trunk and its contents.

The second part of our invention relates to a set of movable baling-trunks so arranged as to permit the liberation of the bale the moment the pressing operation has been effected, said trunks being mounted on wheels which run on a suitable railway, in order that they may be alternately employed.

In the accompanying drawing, which is a perspective view of a baling-press embodying our improvements, A A' represent the main frame, and B a horizontal platform or staging upon which the operators stand. C is the hand-wheel, having a crank, C', and spokes $c'$, and this hand-wheel communicates motion to the rack N of the follower by means of spur-wheels D E F G and pinions $c\ d\ e\ f\ g$, and said spur-wheels are attached to the shafts H, I, J, K, and L, respectively, which shafts revolve in suitable journal-bearings.

The shaft K is also provided with a hand-wheel, M, having a crank, M', spokes $m$, and two ratchets, $m'\ m''$, whose teeth are set in opposite directions, while the sliding shaft J is adapted to a longitudinal movement in its bearings, so as to communicate motion from the pinion $d$ to the spur-wheel F, or to throw said pinion and spur-wheel out of gear when desired.

The shaft J is advanced so as to cause the engagement of pinion $d$ with spur-wheel E, or retracted, so as to throw them out of gear by means of the lever O, and said shaft is retained in either of these positions by the catch P, which engages with the annular grooves $j\ j'$ of the shaft J.

The floor R of the removable baling-trunk is provided with rollers $s$, and the sides T of the trunk are attached to said floor by hinges S S, and these sides are connected together by means of fixed staples U and movable catches V.

W are stops pivoted to the bottom of the baling-trunk, and which, when turned down, come in contact with a beam, Y', which is the central one of three beams, Y Y' Y'', upon which the baling-trunk rests while the hay or cotton is being pressed, thereby relieving the wheels $s$ and their axles of the immense strain.

X X' are tracks which enable the baling-trunks to be moved either under the follower or away from it, as the requirements of the case may demand.

Operation: The sides of the baling-trunk being closed up and securely locked together by the staples U and catches V, it is filled with hay, cotton, or any other substance to be pressed, and the trunk with its contents is then moved along the railway X X' until it reaches a position directly under the follower, at which time the stop W comes in contact with the beam Y' and prevents the trunk from passing beyond its proper place, it being understood that there is a stop on each side of the latter, so as to arrest it as it may be moved in either from one end or the other of the railway. The baling-trunk being thus retained in its proper position, the operator on the platform withdraws the shaft J, so as to uncouple the pinions $d\ e$ and spur-wheels E F, and then proceeds to turn the crank M' in such a direction as to cause the rack N to descend very rapidly, forcing the follower along with it. After the follower has made about one-third of its stroke the shaft J is advanced so as to throw the pinions $d\ e$ and spur-wheels E F in gear, by which means the entire train of pinions and spur-wheels are united; and the operator having changed his position to the opposite side of the press, he then applies his power to the crank C' of the hand-wheel C, and the rack N and its follower are depressed at a very slow speed, but with immense power.

As soon as the hay or cotton has been sufficiently pressed the catches V are unlocked from the staples U, thereby permitting one side of the baling-trunk to be opened, so as to insert the necessary binding ropes or straps around the compressed hay, after which the trunk is removed from under the press, and its other three sides being opened, the bale is liberated without any trouble whatever.

The follower having been elevated while the ties were being secured around the bale and the trunk removed from under the press, another trunk filled with hay or cotton is immediately moved in under the follower, and the pressing operation above described is again repeated.

This provision of the two baling-trunks adapted to run upon the railway enables the pressing of a bale in one trunk while the other is being emptied of its contents, thus making the baling operation a continuous one, and, no time being lost, three men are enabled to do as much work with one press as six or eight can perform with any of the customary kinds now in use.

As the baling-trunks rest upon the beams Y Y' Y'', no amount of pressure can force their bottoms out or spring the axles of the rollers, and if it should be desired to arrest and retain the follower at any part of its stroke, whether ascending or descending, it can be effected by simply causing a pawl to engage with either of the reversed ratchets $m'$ $m''$.

We claim herein as new and of our invention—

1. The provision, in a baling-press, of the sliding shaft J, so arranged as to allow a fast or slow motion of the follower by coupling or uncoupling a train of spur-wheels, D E F G, and pinions $c\ d\ e\ f\ g$, in the manner described and set forth.

2. A baling-trunk all of whose sides T are hinged to the bottom or floor R of said trunk in the manner specified.

3. In combination with the elements of the clause immediately preceding, the staples U, catches V, and stops W, all arranged and operating as and for the purpose described.

In testimony of which invention we hereunto set our hands.

L. SEEBERGER.
N. LEVY.

Witnesses:
GEO. H. KNIGHT,
JAMES H. LAYMAN.